H. Voelter.
Paper Making Mach.
No. 3,361.
Reissued Apr. 6, 1869.
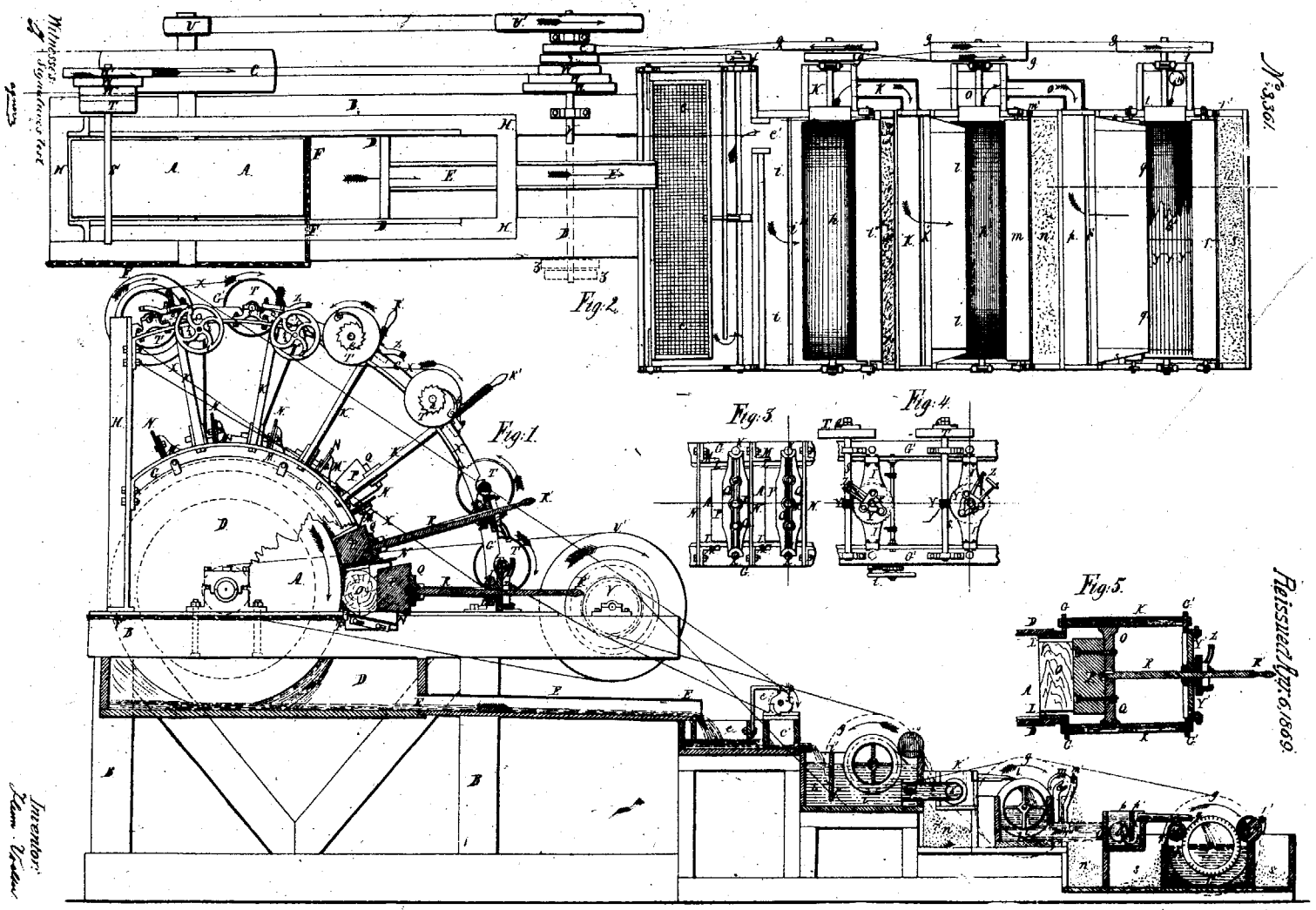
Witnesses:
Signatures test
agnew
Inventor:
Henry Voelter

UNITED STATES PATENT OFFICE.

ALBERTO PAGENSTECHER, OF CURTISVILLE, MASSACHUSETTS, ASSIGNEE OF HENRY VOELTER.

IMPROVEMENT IN REDUCING WOOD FIBERS TO PAPER-PULP.

*Specification forming part of Letters Patent No.* 21,161, *dated August* 10, 1858; *antedated August* 29, 1856; *reissue No.* 3,361, *dated April* 6, 1869.

*To all whom it may concern:*

Be it known that HENRY VOELTER, of the city of Heidenheim, in the Kingdom of Würtemberg, Germany, did invent an Improved Machine for Reducing Wood Fibers to Paper-Pulp; and that the following is a full, clear, and exact description thereof, which will enable those skilled in the art to make and use the same, reference being had to the accompanying drawing, forming part of this specification, in which drawing—

Figure 1 represents an elevation with partial sections, and with a portion of the outer casings removed, so as to exhibit the various processes of grinding and assorting. Fig. 2 gives a plan or top view of the machine with the feed-motion detached therefrom, and the water-channels, conducting-pipes, and receiving-boxes cut open. Figs. 3, 4, and 5 represent details of the iron frame-work encircling the upper part of the stone, as seen in Fig. 1; they also give top views of the working parts of the feed-motion.

Similar letters indicate corresponding parts.

The principle and the elements of this invention, as will be hereafter exhibited, have nothing in common with any known or used machinery or apparatus for preparing and assorting wood pulp, except the employment of a circular and rotating mill or grinding stone as a reducing agent; and even this method of obtaining the fibers of wood by employing such a stone, caused to revolve and made to act upon said material, and by directing, at the same time, a current of water to the stone before its contact with the material to be reduced, belongs to the invention, and has been patented by Christian Voelter, of the firm of Henry Voelter Sons, in various countries of Europe—in France as early as 1847, patent dated April 11, and published in the 10th volume of the official patent reports of France for the year 1852.

It is also known that for this very same purpose, and for a similar invention, a patent has been taken out in Great Britain by R. A. Brooman, of London, England, 1853, (see repertory of patent-inventions, May, 1854, page 410, and Mechanics' Magazine, 1854, No. 1613,) for a process of reducing blocks of wood to pulp, and for the purpose of making it into paper by means of mechanical agents, consisting of a millstone or cylinder acting upon pieces of wood held in a frame, always in the direction of the length or grain of the fibers and parallel thereto. In connection with this he claims the particular arrangement of the machine employed for reducing the wood, and also describes the method of assorting or separating the pulp, after leaving the stone, by employing a current of water and a series of shaking frames or boards with sieves of different gages.

It may here be proper to state that at the time a patent was applied for in France for the reducing machinery by Christian Voelter, this last-mentioned separating apparatus had already been in use in his establishment. Owing to its imperfect operations, however, and the constant manual assistance it required, he did not deem it worth patenting.

Brooman, in his patent for the reducing process, distinctly describes and claims that the wood to be reduced shall be placed on the stone with its fibers running in the same direction as that in which the stone revolves, and considers this arrangement absolutely essential. Now, manifold experiments have shown that in order to carry out this plan, not only an enormous amount of power is consumed by keeping up the proper speed of the revolving stone, since the blocks to be reduced, and when located as he describes, gradually become so many regular brakes by assuming more and more the shape of the circular grinding-surface; but, what is still worse and most objectionable, the grinding by degrees takes place in such a manner as to destroy the length of the fibers, and to grind up the filaments completely.

On the other side, a most important and decidedly novel feature is introduced by constructing and arranging the reducing apparatus in such a manner as to admit, first, of a position of the block with its fibers parallel to the axis of the revolving stone; and, second, owing to this very position, to be able to locate a number of them behind each other, so as to cause the fibers, when separated from the first block of wood, to pass under the grinding-surface of the second block, and thence along, with the fibers separated from the latter, to and under the third, fourth, fifth, and sixth one, and so on.

The principal portions of the fibers having thus been several times in contact with the grinding-stone, leave it as pulp of a better and much more uniform quality; the separation may be carried on to any extent, and the better and very best sorts of paper can be produced.

The nature of this invention for making and assorting wood-pulp, generally speaking, therefore, consists, first, in the particular mode of applying or locating a block of wood upon the grinding-surface of a circular and rotating millstone, with its fibers transversely to the face of the stone, or parallel with the axis thereof, for the purpose of separating the fibers from the wood and reducing them to pulp; second, in placing a number of such blocks on or above the upper right or left hand quarter of the said stone, according to the direction in which it revolves, behind each other, and with their fibers running parallel to the axis of the stone, the blocks to be confined within stationary boxes, and held in their respective position during the grinding process by a strong and suitable framing; third, in combining with the blocks, arranged in relation to the stone as described, a self-acting feeding apparatus, which receives a positive motion by the revolving stone itself, said feed to be so constructed that, in case of need, its action is automatically intercepted at any desired moment, or that its motion is diminished to any degree, when the momentary condition of the grinding-surfaces of the blocks should demand it, rendering thereby the reducing machinery more perfect and susceptible of yielding, and capable of adapting itself to the condition of the material, and to retain the filaments of the wood after the reducing process; fourth, in the novel manner of assorting or separating the pulp, by employing for this purpose, and in close connection with the reducing device, a series of hollow and rotating cylinders or reels, covered with sieves of various gages, together with a number of rollers or receivers made to bear upon the circumference of said cylinders and revolving in opposite directions, in combination with a steady and subtile current of water caused to spread evenly over their surfaces, said cylinders to be placed within channels or troughs, and located beside or behind each other, yet descending gradually and sufficiently to make the watery pulp pass by its own gravity from the first one upon the second, thence to flow over the third, fourth, and so on, whereby the pulp can be assorted and separated in different ways by directing it either to flow immediately upon the first rotating cylinder and to spread over its outside surface, the finer particles then passing with the entering water through the sieves and the interior of the cylinder, and into the conducting-channels upon the surface of the succeeding sieve of a still finer texture, while the coarser fibers, adhering to the outer surface, are taken off by the receiving-rollers. The separated and finer particles may also be received and carried away at once, and separately, through an extra channel placed at a slope within the first rotating cylinder; or the pulp may not be caused to flow directly upon the cylinder, but merely in its channel or trough. The mass will then be constantly agitated by the rotation of the cylinder, the tendency of the water to pass through the sieves carrying again the finer particles along, while adhesion will cause the coarser ones to collect upon the outside, ready to be taken up by the roller and thrown into a separate position, the assorting apparatus fulfilling thereby the second condition—viz., producing paper from wood economically and without manual assistance.

To enable those skilled in the art to fully understand this invention, I will now proceed to describe its construction and operation.

The letters A A, in Figs. 1, 2, and 5, designate a cylindrical grindstone of any suitable width and diameter, employed for reducing the blocks. It is fixed in a vertical position on a shaft turning in suitable bearings, and mounted upon or between the strong wooden framing B, the sides of said framing being tightly planked up to form a water-tight casing, D D, for the stone to revolve in. Said stone receives a rotary motion at the rate of one hundred and twenty to two hundred and fifty revolutions per minute, according to size and diameter, from the main pulley C, Fig. 2, and a driving-belt connecting with the line-shafts or engine. The under part of casing or box D D is provided with an outlet, E, for the ground pulp and the water, which is introduced by the pipe F, for the purpose of wetting the stone and mixing with the pulp during the operation of grinding. G G and G′ G′, in Fig. 1, are strong iron arches or side frames of suitable dimensions to receive the feeding apparatus and the auxiliary machinery connected therewith. They are strongly combined and firmly bolted to the main framing B by means of the iron bed-plate and standard H H, while their vertical and parallel position is maintained by iron braces or traverses I I, (see Fig. 4,) the latter forming, at the same time, the support of the driving machinery, actuating the feed of the blocks. Additional connections between the arches G G and the outer segments G′ G′ are established by the employment of wrought-iron columns or rods K K K, bolted at proper distances firmly between them, keeping the arches in a proper relation to each other, and rendering the whole a firm and substantial structure.

The inner arches G G, encircling the stone on each side, form a water-tight joint with the casing D, while their inside faces are lined with the wooden segments L L, Fig. 5, slightly lapping over the edges of the stone, so as to prevent the fibers when separated, or any other foreign substance, from passing between the casing and the stone and causing friction or accident.

M M M are brackets cast at suitable divisions upon the outer rims of the two arches G G. They are made to receive the plates N N, the latter fitting closely between the arches G G, and forming thereby the partitions of regular and separate boxes, which, being located behind each other on the circumference of the stone, serve as recipients for the blocks to be reduced.

It is obvious that any number of such boxes may be applied, of any desirable size to suit the dimensions of the stone It is, however, essential that they should not be carried any farther round its circumferential surface than indicated in Fig. 1—that is to say, not much over the right or left hand upper quarter of the stone, according to the direction of its rotation. It is also most important that the revolving motion of the stone should always take place in the direction indicated by the arrow in Fig. 1, when the boxes containing the wood are placed as shown in said figure. O O, in Figs. 1 and 5, represent the blocks of wood when in contact with the stone for the purpose of being reduced. The wood, of course, is first cut and split into pieces of suitable length, and then prepared for the operation by freeing it from bark, knots, and adhering foreign matters, and it must be remarked that almost any kind of wood can be made use of, according to quality and color of the paper to be produced.

It now remains to explain the automatic and self-intercepting action of the feed-motion. From observing Figs. 1 and 5, it will be perceived that the blocks are acted or pressed upon by the followers P P, so as to distribute a regular pressure on the whole surface of the blocks. These followers P P are bolted firmly to the iron press-plate Q Q, and the latter terminate in the spindles or feed-screws R R R, extending outward and passing through apertures in the traverses I I, so that by pulling or pushing the spindles R R R out and in, or by raising and lowering the same, the presser-plates Q Q, with their followers P P, are brought to act upon the blocks O O, the supporting-columns K K K, by doing so, serving at the same time as guideways to keep the said plates Q Q and spindles R R in a rectilinear direction and at right angles with the blocks, as shown in Fig. 3. Now, around the circumference of the outer framing G′ G′ are located a number of cross-shafts, S S S, having their stationary bearings firmly secured upon the rims of said framings, and carrying on their extremities the driving-pulleys T T T, a positive and rotary motion being transmitted to them in the following manner, viz: A small driving-pulley, U, is keyed upon the outer end of the grindstone-shaft, to convey a suitable motion to the counter-shafts V. This shaft V may be set somewhere upon the main framing B B, or attached to bearings in any osition fit, to again convey motion by a belt to the uppermost and first cross-shaft S, by aid of the cone-pulleys W W W and W′ W′ W′, whereby the speed of the shaft S′, and subsequently of shafts S S S, can be varied at pleasure, by connecting these shafts with the first shaft S′, which may be effected by running the endless band X from pulley T alternately above or below the rims of the pulleys T T T of shafts S S S. Motion being thus conveyed to said shaft by the reducing agent or stone itself, it is evident that said shafts will, at any moment, partake of the least changes in the velocity of the stone, and if they are made to actuate the feed, control the same accordingly.

To accomplish this a worm, Y, is placed and secured upon each of the shafts S S S, Fig. 4, to gear with and give a slow motion to the worm-wheels Y′ Y′. The traverses I I I, as already stated, form the support and the stationary bearings for the wheels by letting their hubs pass through the centers of the traverses in such a manner as to allow the wheels to turn freely upon them. To keep the wheels in their proper position to the worms and within their bearings, a strong collar is shrunk on or otherwise fastened to the projecting ends of the hubs, forming a solid shoulder to bear against, and preventing thereby the wheels from rising when power is applied. The hubs of the wheels Y′ Y′ Y′ are bored out sufficiently large to receive the feed-screw or spindles R, and to allow them to slide freely through and over the threads of the spindles, and to admit of raising or lowering them by taking hold of their handles R′. Z Z, in Figs. 1 and 5, designate a pair of iron jaws, provided with spring and catch to readily open and close when required, one of these jaws being firmly secured and bolted to the upper face of each wheel Y′ Y′, partaking thereby of its rotary motion, while the inner concave surfaces of the said jaws contain screw-threads matching with those of the feed screws and the jaws by encircling the screws, after the same have passed through the traverses, and the hubs of wheels Y′ Y′ form thus the two halves of a nut. It is, therefore, obvious that by closing the jaws and giving motion to the wheels Y Y, they (that is to say, the j rs forming the nut) will revolve, and, being kept within its bearings, will necessarily act upon and urge down the feed-screws, together with the plates Q Q, and this in proportion to the velocity given to the worm-shafts S S. By simply opening the jaws Z the screw is readily disengaged; it may then be pulled back and made ready again to descend. To facilitate this drawing back, or rather raising of the uppermost screws, being not within the reach of the attending workman, little hand wheels, 1 and 2, Figs. 1 and 4, mounted on small cross-shafts, have been provided for hoisting up the spindles by aid of a rope and drum, or a similar lifting device. An arrangement of the foregoing description, when combined and constructed as proposed, would constitute an automatic feeding apparatus possessed with a reliable motion. Now, in order to render it at the same time self-intercepting, for the purposes already stated, the following arrangement has been resorted to: The pulleys T T are not keyed fast upon the worm-shafts S S S, but are made to run loosely upon them; they are facing, however, the disks or ratchet-wheels *a a*, which are fixed upon the shafts, as shown in Fig. 1, where, for the sake of a better understanding, two of these shafts are represented turned over, thereby showing the ratchets and pulleys in front. The pulleys carry the steel springs *b b*, pressing firmly upon the ratchet-wheels, and with a tension so adjusted as to move along the shafts S S S, and consequently to operate the feed, when the machinery is in an ordinary and regular state of working, but letting loose instantly, and intercepting or stopping for the time the action of the feed, when an undue friction takes place, or a diminished pressure upon the blocks is momentarily required. Should one or the other of the blocks be reduced or ground up sooner than the attending workman might expect it, this same contrivance will indicate the fact by a noise sufficiently distinct to call his immediate attention and prevent the machinery from serious breakages, which inevitably would occur by working up the spindles and plates against the framing G G, and further than the guide-rods K K will permit. The machinery, as described, is fully self-acting; it requires no further assistance but to supply the box with fresh material when one or the other of the blocks is reduced; nor does this manipulation demand a minute's delay or the stopping of the machine, as it simply consists in the opening of the nut or jaws Z, the pulling back of screws R R for the introduction of the material, and the reclosing of the nut Z, when the feeding up is resumed and continued without further assistance.

Having now minutely described the reducing machinery, I will proceed to explain the second part of this invention, so integrally combined with the first one—viz., the novel device proposed for assorting the fibers when separated from the wood.

E E, in Fig. 1, as already stated, is an outlet and channel of the casing D D, for the purpose of leading or carrying the watery pulp to the cylinder. This pulp first passes from the channel E E E into the shaking-frames *c c*, covered with sieves of the coarsest gages, and constructed on what is termed "Donkin's" plan, which is an old and well-known contrivance. The shaking or rocking motion naturally pertaining to its construction, as well as the rotary motion of the succeeding and separating cylinders, is conveyed by one and the same counter-shaft V, by aid of the pulleys *d* and *e* and the pulleys *f g* in Fig. 2. The shaking-frame *c c*, in this invention, serves only to throw out and separate extraneous substances, and such fibers as are unfit for paper-making; in most cases, however, it would be advisable to employ a large cylinder in its stead, of a construction similar to that of the assorting-cylinders hereinafter described.

The mode of assorting the pulp after leaving the frame *c c* is very simple, and has in its nature already been described. I will, therefore, merely refer to the details of the apparatus as represented in the drawings. In Figs. 1 and 2, *h h¹ h²* indicate the rotating cylinders, their entire surfaces covered with sieves of gradually-increasing fineness, say from sixteen up to two thousand meshes per square inch; and it is very essential for the good working order of the cylinders that the sieves should be very carefully and accurately put on. To facilitate this, their circumferences should be provided with a sufficient number of strips *y y y*, running throughout the length of the cylinders, as shown at *h'*, Fig. 2, for the sieves to fasten or screw to.

Rollers instead of strips turning in stationary bearings may also be employed to support the sieves; the same might then revolve or rotate upon them and independently from the shafts of the cylinders. The last cylinder, *h²*, is covered with sieves of the finest gages. It is called the pulp-catcher, in as far as it terminates the assorting process by taking up or catching within itself the finest particles of the pulp, the waste-water being allowed to flow off entirely through the channel *t t* and the pipe *u*.

The nature of my assorting process principally consists in the employment of revolving cylinders for the purpose of dividing the finer particles by causing them to pass through these cylinders—that is, to enter through their perforated surfaces and into the interior portion of the same—while the coarser particles are scraped off from without. It is evident that the only communication existing between the cylinders succeeding each other in the separation is established by the meshes of the sieves they are covered with, and that the water and watery pulp contained, for instance, in the trough and around the exterior of the first cylinder can only reach the following finer one by passing through the sifting-envelope of the former. The cylinders *h h¹ h²* are, therefore, tightly closed up on one end, while the other and open end of cylinder *h* communicates with the conducting-pipe and distributing-trough of the following cylinder, *h¹*, and so on, as seen in the elevation, Fig. 1, and the top view, Fig. 2. The letter *i* designates the first receiving-trough, in which the cylinder *h* revolves. The pulp and water are carried into it after leaving the frame *c c*, and after having passed through the channel *c' c'* in the direction of the arrow at Fig. 2. To prevent sand or particles of stone, &c., from getting into the trough *i i* and upon the cylinders, the passage through the partition *c'* is somewhat raised, say one inch or so. This forms a sort of a weir for the mass to flow over and to cause the heavy and hard substances to settle there. It is most essential that the flow of water and pulp be as uniform as possible, and that the sheet of the liquid touching the cylinders, and when spreading over their surfaces, be kept in the most perfect state of tranquility. To achieve this, partitions *i* K′ *p*′ are inserted in the troughs and reservoirs *i*, *h*, and *p*, so that they separate the body of the water at the surface, and allow it to communicate only underneath and at the lowest point of the water. The mode of separating by letting the pulp flow into the surrounding trough, instead of leading it directly upon the rotating cylinder, is illustrated in Fig. 1 of the drawings at the first cylinder *h* and its trough *i i*. The mass in said cylinder is slightly agitated by the rotation of the cylinder, and the coarse fibers adhering without are taken up by the touching roller and separated, while the water and the finer particles are entering the sieves. This finer pulp, with the water, next reaches the receiving-box or reservoir K K by aid of the conducting pipes communicating with the interior of cylinders *h*; it is then caused, owing to the lower position of box K, to flow by its own gravity evenly and gently over the apron *l l*, and upon the surface of cylinder *h*. The separation here is continued in the same way, by letting the pulp spread directly over and upon the sieves of $h^1$, the coarser fibers being again taken up and separated by the roller $i^2$ touching upon said cylinder, and so on. The letters $i^2$ *m r*, in Figs. 1 and 2, show the various take-up rollers. They are made of wood, carefully covered with flannel, rubber, or similar soft substance. There may be also employed one, two, or more of such rollers in contact with each cylinder, according to its size and working capacity. Straight bars or doctors running closely along the surface of the rollers, as seen at *m*′ and *r*′ in Figs. 1 and 2, serve to scrape off and deliver from the rollers the separated fibers received from the cylinders, and to deposit them, according to their respective fineness, in the different boxes, *n n*′ *s s*′, provided therefor. The still finer pulp, having penetrated the meshes of the cylinder $h^1$, again passes through it and into the conducting-channel *o o*; thence to the next receiving-box, *p* and *p*; and, for the reason set forth, it is once more compelled to descend or flow over the apron *q q* upon the cylinder or pulp-catcher $h^2$, which, in the drawings, terminates the separating process. The entrance into this cylinder by the finest and very best portion of the pulp takes place precisely the same way as before stated, and the outside separation is again effected by the rollers *r r* and the doctors *r*′ *r*′. To more readily collect the finest pulp in the cylinder $h^2$, a series of small buckets may be placed and secured within in such a manner as to cause the waste-water to escape freely through the channel *t t*. The trough *i*″ *i*″ of cylinders *h*″ is of a semicircular shape, to prevent the fibers from collecting or settling at the bottom or in the sharp corners, increasing thereby the constant taking up of the mass by the rotation of the cylinder.

It is here necessary to remark that the pulp, before reaching this last cylinder, may pass two or more intermediate sieves or cylinders of increasing fineness, and it will only be necessary to give them and their surrounding troughs *i i*′ *i*″ the proper degree of declivity to secure an easy and gentle descent of the pulp.

By a careful perusal of this specification and drawings, it will certainly be admitted that the problem of utilizing wood for paper-making on an extensive scale has been practically solved by this invention, and that the use and assistance of my self-acting machinery will make it an object to employ wood or woody fibers as a substitute for rags.

Z Z, Fig. 2, indicate the cone-pulleys to transmit motion to the cylinders, when they are placed as shown in the drawings.

The employment of a grinding-stone and water for the purpose of reducing wood for paper-pulp is distinctly disclaimed; but,

Having thus described this invention, what is claimed as new, and desired to be protected by Letters Patent, is—

1. Placing the blocks of wood to be reduced with their fibers running parallel to the axis of the stone, or tranversely to its face, substantially in the manner shown and described.

2. The arrangement of two or more blocks on the circumference of one and the same stone, one block behind the other, so that the fibers torn off by the action of the stone from the first block will be carried under the succeeding block and again exposed to the grinding action of the stone, as set forth.

3. The automatic feed-motion, constructed of screw-spindles R, followers P, and jaws Z, in combination with the stone A, substantially as shown and described.

4. The pulleys T and ratchet-wheels *a*, in combination with the jaws Z, screw-spindles R, followers P, and stone A, substantially as described.

5. The separating mechanism, consisting of a series of perforated and rotating cylinders, in combination with the separating rollers, channels, and troughs, substantially as shown and described.

ALBERTO PAGENSTECHER.

Witnesses:

W. HAUFF,

ERNEST F. KASTENHUBER.